Nov. 14, 1933.  E. F. W. ALEXANDERSON  1,935,427
TELEVISION APPARATUS
Filed Oct. 16, 1931
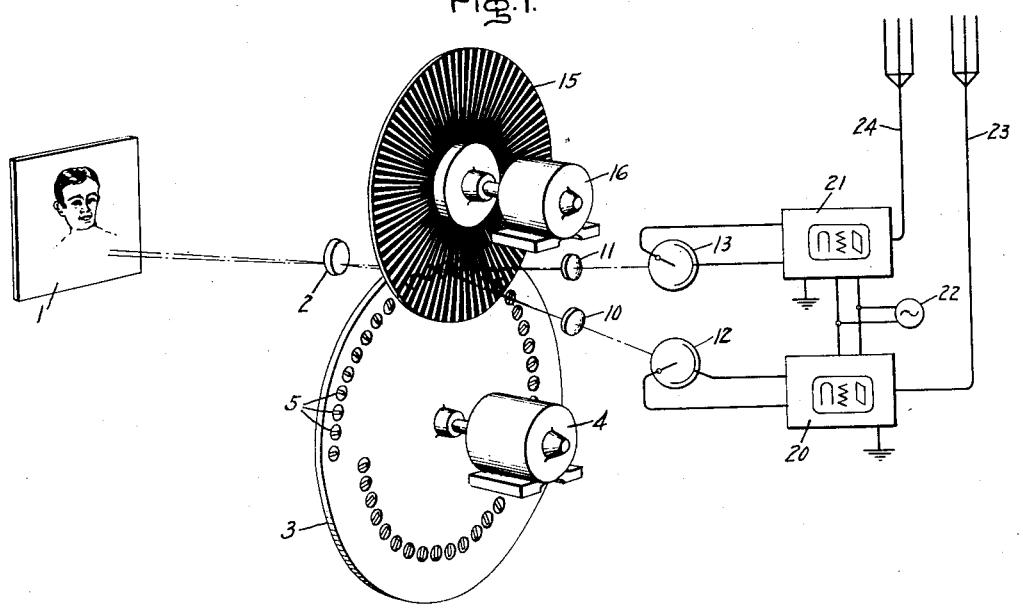
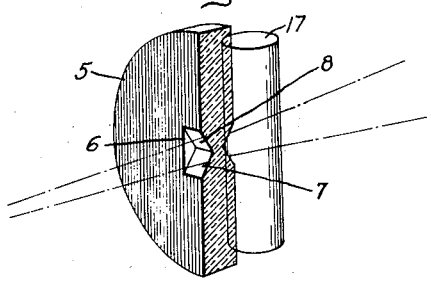
Inventor:
Ernst F. W. Alexanderson,
by *Charles W. Allen*
His Attorney.

Patented Nov. 14, 1933

1,935,427

UNITED STATES PATENT OFFICE 1,935,427

TELEVISION APPARATUS

Ernst F. W. Alexanderson, Schenectady, N. Y., assignor to General Electric Company, a corporation of New York Application October 16, 1931. Serial No. 569,302

7 Claims. (Cl. 178—6)

My invention relates to television apparatus. One object of my invention is the provision of improved means whereby the scanning is done in a simple and efficient manner simultaneously by a plurality of spots, resulting in either greater detail or greater rapidity. Another object of my invention is the provision of improved means of transmitting impulses corresponding to the illumination of said spots.

My invention will be better understood from the following description taken in connection with the accompanying drawing, and its scope will be pointed out in the appended claims.

Referring to the drawing, Fig. 1 is a combined perspective view and circuit diagram of one embodiment of my invention, and Fig. 2 shows a detail thereof.

At Fig. 1 of the drawing 1 represents a picture or view which is to be transmitted to a distant station. By means of the lens 2 this picture or view is imaged on the scanning disk 3 which is arranged to be driven at a uniform speed by the motor 4. Mounted in the disk 3 in the form of a spiral are the inserts 5 which correspond to the lenses commonly used in scanning disks. In the present case, however, each of these inserts, shown to a larger scale in Fig. 2, comprises glass or quartz disk which is opaque except for the rectangular window 6 at the center thereof. This window preferably is approximately twice as long radially of the disk as it is wide. Each insert behind the window is formed with flat sides 7 and 8 so as to constitute respectively two prisms with their apexes together. Each window 6 is of such a size that it corresponds with two adjacent unit areas of the image, the light from the lower unit area as seen in Fig. 2 being refracted downwardly and the light from the upper unit area being refracted upwardly. In the paths of these two light beams are arranged the condensing lenses 10 and 11 respectively and beyond these lenses are the two photo-electric tubes 12 and 13 into which the light from the respective lenses is focused. By this arrangement it will be seen that two adjacent unit areas of the picture or view are simultaneously scanned, the light from the two areas being caused to actuate the respective photo-electric tubes 12 and 13. Thus if the scanning disk 3 is provided with 48 inserts 5 the picture or view will be scanned at each rotation thereof by double that number of spots which is equivalent to a 96 line picture. Behind the scanning disk 3 is the chopper wheel 15 shown as comprising alternate narrow transparent and opaque segments which chopper is arranged to be driven by the motor 16 at a peripheral speed which may be of the same order as that of the disk 3. Attached to and arranged behind the window of each insert 5 of the scanning disk is the small cylindrical lens 17 which for convenience may be in the form of a small glass rod. The purpose of these cylindrical lenses is to focus the light passing through the two portions of each window on the segments of the chopper disk.

The electrical impulses produced by the photo tubes 12 and 13 may be transmitted to a distant station by wire, radio, or any other desired means. I prefer, however, to transmit these impulses by the use of a plurality of tuned antennae, which arrangement I shall now describe.

Photo tubes 12 and 13 are connected respectively with the combined amplifier and modulating apparatus shown at 20 and 21 which are supplied with a suitable carrier frequency from the common source 22. The carrier frequency modulated by the output of tube 12 is radiated by the antenna 23, and the carrier frequency modulated by the output from the tube 13 is radiated by the antenna 24. These antennae are sharply tuned so that one will radiate the carrier and substantially only one side band while the other will radiate the carrier and substantially only the other side band. The tuning of these antennae is not necessarily so sharp that there will be a complete separation in the two channels thus created; however, the separation is sufficiently complete for the present purposes inasmuch as the two unit areas of the picture or view being transmitted at the same instant are adjacent each other and lie in adjacent scanning lines.

It will be understood that while I have specifically shown and described apparatus for transmitting a picture or view, apparatus of a similar nature is adapted for use at the receiving end where suitable light sources would be employed in place of the photo-electric tubes and controlled by similar tuned antennae; also in the receiving apparatus a chopper obviously would not be employed.

I have chosen the particular embodiment described above as illustrative of my invention and it will be apparent that various other modifications may be made without departing from the spirit and scope of my invention which modifications I aim to cover by the appended claims.

What I claim as new and desire to secure by Letters Patent of the United States is:—

1. Television transmitting apparatus comprising a scanning disk having a series of light openings, prismatic means at said openings for deflecting the light passing through one portion of each opening relative to that passing through another portion thereof, means for imaging adjacent unit areas of the transmitted view respectively on said portions and a plurality of photoelectric means arranged to receive the light respectively from said portions.

2. Television transmitting apparatus comprising a scanning disk having a series of elongated light openings, prisms at said openings for refracting the light passing through one portion of each opening relative to that passing through another portion thereof, means for imaging respectively on said portions adjacent unit areas of the view being transmitted, and a separate photo-electric device for receiving the light from each of said portions.

3. Television transmitting apparatus comprising a scanning disk having a series of light openings, a pair of prisms at each of said openings for deflecting the light passing through one portion of each opening relative to that passing through another portion thereof, means for imaging adjacent unit areas of the transmitted view respectively on said portions, a chopper behind said disk, a lens at each disk opening for focusing the light passing therethrough on the chopper and a plurality of photo tubes arranged behind the chopper to receive respectively the light deflected by each of the prisms.

4. Television transmitting apparatus comprising a scanning disk having a series of elongated light openings, prisms at said openings for refracting the light passing through one portion of each opening relative to that passing through another portion thereof, means for imaging respectively on said portions adjacent unit areas of the view being transmitted, a chopper behind said disk, a cylindrical lens at each of said openings arranged parallel to the elements of said chopper at the point of intersection of the light, and a separate photo-electric tube in the path of the light from each of said portions.

5. In television apparatus, a scanning disk having a series of light openings each comprising portions arranged radially with respect to each other, and a pair of prisms at each opening arranged to deflect the light passing one portion with respect to the light passing the other portion.

6. In television apparatus, a scanning disk having a series of light openings and a pair of prisms at each of said openings arranged radially with respect to each other, whereby all of the light passing said openings is refracted by one prism or the other.

7. In television apparatus, a scanning disk having a series of light openings, a plurality of prisms in each opening arranged to cause a radial diversion of the light passing the openings and a radially positioned cylindrical lens adjacent each opening.

ERNST F. W. ALEXANDERSON.

DISCLAIMER 1,935,427.—*Ernst F. W. Alexanderson*, Schenectady, N. Y. TELEVISION APPARATUS. Patent dated November 14, 1933. Disclaimer filed August 9, 1935, by the assignee, *General Electric Company*.

Hereby enters the following disclaimer to claims 1, 2, 5, and 6 of the said Letters Patent, which are in the following words, to wit:

"1. Television transmitting apparatus comprising a scanning disk having a series of light openings, prismatic means at said openings for deflecting the light passing through one portion of each opening relative to that passing through another portion thereof, means for imaging adjacent unit areas of the transmitted view respectively on said portions and a plurality of photo-electric means arranged to receive the light respectively from said portions.

"2. Television transmitting apparatus comprising a scanning disk having a series of elongated light openings, prisms at said openings for refracting the light passing through one portion of each opening relative to that passing through another portion thereof, means for imaging respectively on said portions adjacent unit areas of the view being transmitted, and a separate photo-electric device for receiving the light from each of said portions."

"5. In television apparatus, a scanning disk having a series of light openings each comprising portions arranged radially with respect to each other, and a pair of prisms at each opening arranged to deflect the light passing one portion with respect to the light passing the other portion.

"6. In television apparatus, a scanning disk having a series of light openings and a pair of prisms at each of said openings arranged radially with respect to each other, whereby all of the light passing said openings is refracted by one prism or the other."

[*Official Gazette September 3, 1935.*]